(12) United States Patent
Meyer et al.

(10) Patent No.: US 9,005,762 B2
(45) Date of Patent: Apr. 14, 2015

(54) USE OF AQUEOUS POLYURETHANE DISPERSIONS FOR COMPOSITE FOIL LAMINATION

(71) Applicants: Axel Meyer, Heidelberg (DE); Karl-Heinz Schumacher, Neustadt (DE); Christoph Kiener, Weisenheim am Sand (DE)

(72) Inventors: Axel Meyer, Heidelberg (DE); Karl-Heinz Schumacher, Neustadt (DE); Christoph Kiener, Weisenheim am Sand (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/705,883

(22) Filed: Dec. 5, 2012

(65) Prior Publication Data

US 2013/0149510 A1    Jun. 13, 2013

Related U.S. Application Data

(60) Provisional application No. 61/568,658, filed on Dec. 9, 2011.

(51) Int. Cl.

| | |
|---|---|
| *C09J 175/06* | (2006.01) |
| *C08G 18/12* | (2006.01) |
| *B32B 15/095* | (2006.01) |
| *B32B 3/10* | (2006.01) |
| *B32B 15/04* | (2006.01) |
| *B32B 15/08* | (2006.01) |
| *B32B 27/08* | (2006.01) |
| *C08G 18/08* | (2006.01) |
| *C08G 18/34* | (2006.01) |
| *C08G 18/40* | (2006.01) |
| *C08G 18/42* | (2006.01) |
| *C08G 18/44* | (2006.01) |
| *C08G 18/48* | (2006.01) |
| *C08G 18/66* | (2006.01) |
| *C08G 18/70* | (2006.01) |
| *C08G 18/73* | (2006.01) |
| *C08G 18/76* | (2006.01) |
| *C09J 175/04* | (2006.01) |

(52) U.S. Cl.
CPC ............. *C09J 175/06* (2013.01); *B32B 3/10* (2013.01); *B32B 15/043* (2013.01); *B32B 15/08* (2013.01); *B32B 27/08* (2013.01); *C08G 18/0823* (2013.01); *C08G 18/12* (2013.01); *C08G 18/348* (2013.01); *C08G 18/4018* (2013.01); *C08G 18/4216* (2013.01); *C08G 18/44* (2013.01); *C08G 18/4854* (2013.01); *C08G 18/6625* (2013.01); *C08G 18/6659* (2013.01); *C08G 18/706* (2013.01); *C08G 18/73* (2013.01); *C08G 18/7621* (2013.01); *C09J 175/04* (2013.01); *Y10T 428/24802* (2013.01); *Y10T 428/24917* (2013.01)

(58) Field of Classification Search
USPC .................... 428/423.7, 423.5, 424.8, 425.8; 156/331.7; 524/591
See application file for complete search history.

(56) References Cited

U.S. PATENT DOCUMENTS

| | | |
|---|---|---|
| 3,412,054 A | 11/1968 | Milligan et al. |
| 4,192,937 A | 3/1980 | Noll et al. |
| 4,269,748 A | 5/1981 | Nachtkamp et al. |
| 4,292,226 A | 9/1981 | Wenzel et al. |
| 5,494,960 A * | 2/1996 | Rolando et al. ............... 524/591 |
| 5,532,058 A | 7/1996 | Rolando et al. |
| 6,235,384 B1 | 5/2001 | Voss et al. |
| 2007/0151666 A1* | 7/2007 | Moeller et al. ................. 156/327 |
| 2008/0171831 A1* | 7/2008 | Kashiwazaki et al. ......... 524/591 |
| 2009/0286919 A1* | 11/2009 | Moller et al. .................. 524/523 |
| 2011/0041998 A1* | 2/2011 | Mitchell ..................... 156/273.3 |

FOREIGN PATENT DOCUMENTS

| | | |
|---|---|---|
| CA | 1 129 128 A | 8/1982 |
| DE | 10 2005 006 235 A1 | 8/2006 |
| EP | 0 615 988 A1 | 9/1994 |
| EP | 0 884 336 A1 | 12/1998 |
| JP | 56135547 A * | 10/1981 |
| JP | 2004-352905 A | 12/2004 |

OTHER PUBLICATIONS

International Search Report and Written Opinion of the International Searching Authority Issued Feb. 25, 2013 in PCT/EP2012/073818 (with English translation of Categories of Cited Documents).

* cited by examiner

*Primary Examiner* — Thao T. Tran
(74) *Attorney, Agent, or Firm* — Oblon, McClelland, Maier & Neustadt, L.L.P.

(57) ABSTRACT

The use of aqueous polyurethane dispersions is described for composite foil lamination, where at least 10% by weight of the polyurethane derives from at least one amorphous polyester polyol.

20 Claims, No Drawings

USE OF AQUEOUS POLYURETHANE DISPERSIONS FOR COMPOSITE FOIL LAMINATION

This application claims the benefit of U.S. provisional application No. 61/568,658, filed on Dec. 9, 2011.

The invention relates to the use of aqueous polyurethane dispersions for composite foil lamination, where the polyurethane derives from amorphous polyester polyols. The invention also relates to a process for producing the composite foils, and to the composite foils produced by the process.

The adhesive bonding or the lamination of two or more foils made of different materials combines properties of these materials. Flexible packaging is therefore often composed of composite foils adhesive-bonded to one another with a suitable adhesive, where at least one of the foils bonded to one another is a polymer foil. Materials known as lamination adhesives are usually used for the adhesive bonding of the foils to one another. These involve by way of example binder systems which have been dissolved in organic solvents and which crosslink via reaction of polyisocyanate compounds with polyethers or polyesters bearing hydroxy groups, or on exposure of polyisocyanate compounds to water. However, the use of organic solutions of this type as lamination adhesives is technically complicated because the fire risk posed by said solvents requires use of explosion-protected coating systems. There is moreover the risk that residual solvents in the composite laminates will impair the contents to be packed, by flavor contamination and odor contamination.

The prior art relating to adhesives for composite foil lamination includes aqueous polyurethane dispersions as described by way of example in EP 0615988, DE 102005006235, or EP 0884336. The polyurethanes comprised in these dispersions are generally those formed from polyether diols, i.e. from dihydric polyether alcohols as obtained by way of example by polymerization of ethylene oxide, propylene oxide, or butylene oxide. In order to achieve higher strength of the foil composite, these systems can be used in combination with a crosslinking agent. In these two-component systems, the crosslinking agent is admixed shortly prior to use, and strengthens the foil composite. Despite use of crosslinking agents, the aqueous systems disclosed hitherto are, unlike systems based on organic solvents, not adequate for use for producing composite foils exposed to particularly high stresses. Foil composites that can withstand high stresses are needed in particular for what are known as retort applications in food packaging. Here, the entire foil composite with the contents packed therein is subjected to an autoclaving process, in order to sterilize or cook the food comprised in the foil packaging. The foil composite is exposed to high thermal and chemical stresses during this process. Typical conditions are heating to 120° C. for 45 minutes or heating to 130° C. for 30 minutes. Composite films used for this purpose are typically composed of the following foil materials: aluminum foil, printed polyester foil, unprinted polyester foil, printed polyamide foil, unprinted polyamide foil, polypropylene foil. The composite made of aluminum foil and polyester foil raises particular technical problems because good adhesion to the metal foil is difficult to achieve under said conditions. Another use in which the foil composites are subject to high stress is that known as "hot-filling". Here, hot food is inserted into packaging composed of composite foils at temperatures of 85 to 90° C. Previous lamination adhesives based on aqueous polyurethane dispersions have not yet been entirely satisfactory for uses of this type.

The object consists in developing aqueous adhesives which are free from organic solvents and which can be used as lamination adhesives for producing composite foils that can withstand high stresses, in particular for retort applications and for hot-filling applications.

It has been found that the object can be achieved through use of the polyurethane adhesive dispersions described hereinafter. The invention provides the use of aqueous polyurethane dispersions for composite foil lamination, where at least 20% by weight of the polyurethane derives from at least one amorphous polyester polyol.

The invention also provides a process for producing composite foils, which comprises providing an aqueous polyurethane dispersion, described in more detail hereinafter, applying the polyurethane dispersion to a plastics foil or metal foil, and adhesive bonding to one or more further plastics foils and/or metal foils to give a composite foil. The invention also provides composite foils produced by the process of the invention.

The adhesive to be used in the invention consists essentially of at least one polyurethane dispersed in water, as polymeric binder, and optionally of additives such as fillers, thickeners, antifoams, etc. The polymeric binder preferably takes the form of dispersion in water or else in a mixture of water and of water-soluble organic solvents with boiling points which are preferably below 150° C. (1 bar). Water as sole solvent is particularly preferred. The water or other solvent are not included in the calculation of weight data relating to the composition of the adhesive.

Amorphous solids are those which do not have a crystal-lattice arrangement of their constituent units, and are therefore non-crystalline. Amorphous polyesters in the invention are in particular those polyesters which do not have a melting point in the temperature range from −30° C. to +60° C.

It is preferable that the polyurethane comprises an amount of more than 10% by weight or more than 25% by weight, particularly at least 35% by weight, based on the polyurethane, of amorphous polyesterdiols.

The polyurethane preferably derives in total from:
a) at least one amorphous polyesterdiol with a molar mass above 500 to 4000 g/mol,
b) at least one further macrodiol differing from the amorphous polyesterdiol a) and with a molar mass above 500 to 4000 g/mol,
c) at least one organic diisocyanate or one mixture having an arithmetic average NCO functionality of 1.9 to 2.3, of organic isocyanate compounds, preferably toluene 2,4-diisocyanate,
d) at least one compound selected from the group consisting of mono- to trihydric alcohols which also comprise at least one ionic group or at least one group convertible into an ionic group, diaminocarboxylic acids, and diaminosulfonic acids,
e) optionally at least one dihydric alcohol having an average molar mass of 62 to 500 g/mol, and
f) optionally further polyfunctional compounds differing from the monomers (a) to (e) and having reactive groups, where these involve alcoholic hydroxy groups, primary or secondary amino groups, or isocyanate groups, and
g) optionally monofunctional compounds differing from the monomers (a) to (f) and having a reactive group, where this involves an alcoholic hydroxy group, a primary or secondary amino group, or an isocyanate group,
h) at least one organic or inorganic neutralizing agent, preferably ammonia.

The polyurethane preferably derives in total from:
a) 10 to 80% by weight of at least one amorphous polyesterdiol with a molar mass above 500 to 4000 g/mol,
b) 10 to 80% by weight of at least one further macrodiol differing from the amorphous polyesterdiol a) and with a molar mass above 500 to 4000 g/mol,
c) 5 to 30% by weight of at least one organic diisocyanate or one mixture having an arithmetic average NCO functionality of 1.9 to 2.3, of organic isocyanate compounds, preferably toluene 2,4-diisocyanate,
d) 2 to 10% by weight of at least one compound selected from mono- to trihydric alcohols, where this compound also comprises at least one ionic group or at least one group convertible into an ionic group, and diaminocarboxylic acids,
e) 0 to 5% by weight of at least one dihydric alcohol having an average molar mass of 62 to 500 g/mol, and
f) 0 to 5% by weight of further polyfunctional compounds differing from the monomers (a) to (e) and having reactive groups, where these involve alcoholic hydroxy groups, primary or secondary amino groups, or isocyanate groups, and
g) 0 to 5% by weight of monofunctional compounds differing from the monomers (a) to (f) and having a reactive group, where this involves an alcoholic hydroxy group, a primary or secondary amino group, or an isocyanate group,
h) an amount of at least one organic or inorganic neutralizing agent such that at least 20% of compounds d) are present in ionogenic, i.e. neutralized, form.

With a view to good film-formation and elasticity, diols (a) and (b) mainly used comprise relatively high-molecular-weight diols having a molar mass of above 500 to 4000 g/mol, preferably about 1000 to 3000 g/mol. This is the number-average molar mass Mn. Mn is calculated by determining the number of end groups (OH number). It is preferable to use amorphous polyesterdiols which are obtained through reaction of dihydric alcohols with dibasic carboxylic acids. Instead of the free polycarboxylic acids, it is also possible to use the corresponding polycarboxylic anhydrides or corresponding polycarboxylic esters of lower alcohols, or to use a mixture of these, to produce the polyester polyols.

It is preferable that at least one polycarboxylic acid for producing the amorphous polyesterdiol a) is an aromatic dicarboxylic acid, in particular isophthalic acid. In a preferred embodiment, the amorphous polyesterdiol a) is produced by using a mixture of carboxylic acids composed of at least one aliphatic dicarboxylic acid having 3 to 10, preferably 4 to 8, carbon atoms, and of at least one aromatic dicarboxylic acid. The mixing ratio is preferably 0.5:1 to 2:1. One preferred dicarboxylic acid mixture is adipic acid/isophthalic acid, in particular in a ratio of 0.5:1 to 2:1.

Polyhydric alcohols that can be used for producing the polyesterdiols a) and b) are by way of example ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexane, such as 1,4-bis(hydroxymethyl)cyclohexane, 2-methylpropane-1,3-diol, methylpentanediols, and also diethylene glycol, Methylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples here are ethylene glycol, butane-1,4-diol, hexane-1,6-diol, octane-1,8-diol and dodecane-1,12-diol. Preference is further given to neopentyl glycol.

It is preferable to use at least one alkanediol having 2 to 10, preferably 4 to 8, carbon atoms for producing the amorphous polyesterdiols a).

In addition to the amorphous polyesterdiols a) it is also possible to use, as macrodiols b), non-amorphous, i.e. crystalline or semicrystalline, polyester polyols, where these can be produced from polycarboxylic acids and from polyhydric alcohols. Polyhydric alcohols that can be used are those mentioned above. The polycarboxylic acids can be aliphatic, cycloaliphatic, araliphatic, aromatic, or heterocyclic, and optionally substituted, for example, by halogen atoms, and/or unsaturated. Examples that may be mentioned here are: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preference is given to dicarboxylic acids of the general formula HOOC—$(CH_2)_y$—COOH, where y is a number from 1 to 20, preferably an even number from 2 to 20, examples being succinic acid, adipic acid, sebacic acid, and dodecanedicarboxylic acid.

Other macrodiols b) that can be used are polycarbonate diols as can be obtained by way of example through reaction of phosgene with an excess of the low-molecular-weight alcohols mentioned as structural components for the polyester polyols.

Other macrodiols b) that can be used are lactone-based polyesterdiols, where these involve homo- or copolymers of lactones, and preferably involve adducts which are formed by lactones with suitable difunctional starter molecules and which have terminal hydroxy groups. Lactones which can be used are preferably those deriving from compounds of the general formula HO—$(CH_2)_z$—COOH, where z is a number from 1 to 20, and an H atom of a methylene unit can also have been replaced by a $C_1$-$C_4$-alkyl moiety. Examples are epsilon-caprolactone, β-propiolactone, gamma-butyrolactone, and/or methyl-epsilon-caprolactone, and also mixtures of these. Examples of suitable starter components are the low-molecular-weight dihydric alcohols mentioned above as structural components for the polyester polyols. Particular preference is given to the corresponding polymers of epsilon-caprolactone. It is also possible to use lower polyesterdiols or polyetherdiols as starters for producing the lactone polymers. Instead of the polymers of lactones it is also possible to use the corresponding, chemically equivalent polycondensates of the hydroxycarboxylic acids corresponding to the lactones.

Other macrodiols b) that can be used concomitantly are polyetherdiols or alkanediol polycarbonates, or a mixture of these. The alkanediol polycarbonates preferably have from 2 to 10, in particular from 4 to 8, carbon atoms in the alkane chain. Polyetherdiols can in particular be obtained via polymerization of ethylene oxide, propylene oxide, butylene oxide, tetrahydrofuran, styrene oxide, or epichlorohydrin with itself, e.g. in the presence of $BF_3$, or via adduct-formation of said compounds optionally in a mixture or in succession, with starter components having reactive hydrogen atoms, for example alcohols or amines, e.g. water, ethylene glycol, propane-1,2-diol, propane-1,3-diol, 2,2-bis(4-hydroxyphenyl)propane, or aniline. Examples of polyetherdiols are polypropylene oxide, polytetrahydrofuran with a molar mass of 240 to 5000 g/mol, and especially 500 to 4500 g/mol. Polytetrahydrofuran is a particularly preferred polyetherdiol as structural component for the polyurethanes.

Other macrodiols b) that can be used concomitantly are polyhydroxyolefins, preferably those having 2 terminal hydroxy groups, e.g. α,ω-dihydroxypolybutadiene, α,ω-dihydroxypolymethacrylate or α,ω-dihydroxypolyacrylate. Other suitable polyols are polyacetals, polysiloxanes, and alkyd resins.

The molar ratio of amorphous polyesterdiol (a) to macrodiol (b) differing therefrom is preferably 1:5 to 5:1, in particular 1:2 to 2:1.

Particular diisocyanates c) that may be mentioned are diisocyanates $X(NCO)_2$, where X is an aliphatic hydrocarbon moiety having 4 to 15 carbon atoms, a cycloaliphatic or aromatic hydrocarbon moiety having 6 to 15 carbon atoms, or an araliphatic hydrocarbon moiety having 7 to 15 carbon atoms. Examples of these diisocyanates are tetramethylene diisocyanate, hexamethylene diisocyanate, dodecamethylene diisocyanate, 1,4-diisocyanatocyclohexane, 1-isocyanato-3, 5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), such as the trans/trans isomer, the cis/cis isomer, and the cis/trans isomer, and also mixtures composed of said compounds. Diisocyanates of this type are available commercially. Particularly important mixtures of said isocyanates are the mixtures of the respective structural isomers of diisocyanatotoluene and diisocyanatodiphenylmethane, and the mixture of 80 mol % of 2,4-diisocyanatotoluene and 20 mol % of 2,6-diisocyanatotoluene is particularly suitable. Particularly advantageous mixtures moreover are those of aromatic isocyanates, for example 2,4-diisocyanatotoluene and/or 2,6-diisocyanatotoluene, with aliphatic or cycloaliphatic isocyanates, such as hexamethylene diisocyanate or IPDI, where the preferred mixing ratio of the aliphatic to aromatic isocyanates is 4:1 to 1:4. Compounds from which the polyurethanes are derived can be not only those mentioned above but also isocyanates which bear other capped isocyanate groups, e.g. uretdione groups, alongside the free isocyanate groups.

The mono- to trihydric alcohols d) comprise in particular anionic groups, such as the sulfonate group, the carboxylate group, and the phosphate group. The expression ionic group is intended to comprise concomitantly those groups which can be converted into ionic groups. Accordingly, the expression ionic groups also includes the carboxylic acid groups, sulfonic acid groups, or phosphoric acid groups which can be converted into ionic groups through neutralization. Dihydroxycarboxylic acids and diaminocarboxylic acids are preferred as compound d).

Compounds that can usually be used are aliphatic, cycloaliphatic, araliphatic, or aromatic carboxylic acids and sulfonic acids which bear at least one alcoholic hydroxy group. Preference is given to dihydroxycarboxylic acids, in particular dihydroxyalkylcarboxylic acids, especially having from 3 to 10 carbon atoms, as also described in U.S. Pat. No. 3,412,054. Particular preference is given to compounds of the general formula ($d_1$)

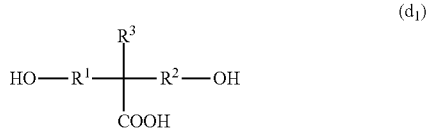

(d₁)

in which $R^1$ and $R^2$ are a $C_1$-$C_4$-alkanediyl (unit) and $R^3$ is a $C_1$-$C_4$-alkyl (unit), and dimethylolpropionic acid (DMPA) is especially preferred.

Other monomers having hydrophilic groups can be used alongside the bifunctional carboxylic acids, examples being appropriate dihydroxysulfonic acids and dihydroxyphosphonic acids, such as 2,3-dihydroxypropanephosphonic acid, or diaminosulfonic acids. However, it is preferable not to use any bifunctional sulfonic acids or phosphonic acids.

To the extent that monomers having potentially ionic groups are used, conversion of these into the ionic form can take place prior to, during, or preferably after the isocyanate-polyaddition reaction, because the ionic monomers are often only sparingly soluble in the reaction mixture. It is particularly preferable that the carboxylate groups take the form of their salts with an alkali metal ion or an ammonium ion as counterion.

The hardness and the modulus of elasticity of the polyurethanes can be increased if diols used also comprise dihydric alcohols e) with a molar mass of about 62 to 500 g/mol, preferably 62 to 200 g/mol. Monomers e) especially used are the structural components of the short-chain alkanediols mentioned for the production of polyester polyols, and preference is given here to the unbranched diols having from 2 to 12 carbon atoms and having an even number of carbon atoms, and also to pentane-1,5-diol and neopentyl glycol. Examples of diols e) that can be used are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes, such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples here are ethylene glycol, butane-1,4-diol, hexane-1,6-diol, octane-1,8-diol and dodecane-1,12-diol. Preference is further given to neopentyl glycol.

It is preferable that the proportion of the diols a) and b) in the polyurethanes, based on the total amount of all of the diols, is from 10 to 100 mol %, or from 60 to 100 mol %, and that the proportion of the monomers e), based on the total amount of the diols a) and b), and of the polyhydric alcohols e), is from 0 to 90 mol %, or from 0 to 40 mol %.

The monomers (f) which differ from the monomers (a) to (e) and which are optionally also constituents of the polyurethane generally serve for crosslinking or for chain extension. They are generally more than dihydric non-phenolic alcohols, amines having 2 or more primary and/or secondary amino groups, or else compounds which bear one or more primary and/or secondary amino groups alongside one or more alcoholic hydroxy groups. Examples of alcohols with higher functionality than 2 which can serve for adjustment to a particular degree of branching or of crosslinking are trimethylolpropane, glycerol, and sugars. It is also possible to use monoalcohols which bear another group reactive toward isocyanates, alongside the hydroxy group, for example monoalcohols having one or more primary and/or secondary amino groups, e.g. monoethanolamine.

Polyamines having 2 or more primary and/or secondary amino groups are used especially when the chain extension or crosslinking is intended to take place in the presence of water, because amines generally react more rapidly than alcohols or water with isocyanates. That is often a requirement when aqueous dispersions of crosslinked polyurethanes or of polyurethanes with high molecular weight are desired. In such cases, the procedure is to produce prepolymers having isocyanate groups, to disperse these rapidly in water, and then to achieve chain extension or crosslinking through addition of compounds having a plurality or amino groups reactive toward isocyanates. Amines suitable for this purpose are generally polyfunctional amines in the molar mass range of 32 to 500 g/mol, preferably 60 to 300 g/mol, which comprise at least two amino groups, selected from the group of the primary and secondary amino groups. Examples here are diamines, such as diaminoethane, diaminopropanes, diaminobutanes, diaminohexanes, piperazine, 2,5-dimethylpiperazine, amino-3-aminomethyl-3,5,5-trimethyl-cyclohexane (isophoronediamine, IPDA), 4,4'-diaminodicyclohexylmethane, 1,4-diaminocyclohexane, aminoethylethanolamine, hydrazine, hydrazine hydrate, and triamines, such as diethylenetriamine and 1,8-diamino-4-aminomethyloctane.

The amines can also be used in capped form, e.g. in the form of the corresponding ketimines (see by way of example CA-A 1 129 128), ketazines (cf. e.g. U.S. Pat. No. 4,269,748), or amine salts (see U.S. Pat. No. 4,292,226). Oxazolidines as used by way of example in U.S. Pat. No. 4,192,937 are also capped polyamines that can be used for the chain extension of the prepolymers for producing the polyurethanes of the invention. When capped polyamines of this type are used, these are generally mixed with the prepolymers in the absence of water, and this mixture is then mixed with the dispersion water or with a portion of the dispersion water, in such a way that the corresponding polyamines are liberated by hydrolysis.

It is preferable to use mixtures of di- and triamines, and it is particularly preferable to use mixtures of isophoronediamine (IPDA) and diethylenetriamine (DETA).

The polyurethanes preferably comprise, as component (f), from 1 to 30 mol %, based on the total amount of all of the polyfunctional compounds reactive toward isocyanate, particularly preferably from 4 to 25 mol %, of at least one polyamine having at least two amino groups reactive toward isocyanates. It is also possible to use, as monomers (f), for the same purpose, isocyanates having functionality greater than 2. Examples of compounds available commercially are the isocyanurate or the biuret of hexamethylene diisocyanate.

Monomers (g) which are optionally used concomitantly are monoisocyanates, monoalcohols, and monoprimary and -secondary amines. The proportion of these is generally at most 10 mol %, based on the entire molar amount of the monomers. These monofunctional compounds usually bear other functional groups, such as olefinic groups or carbonyl groups, and serve to introduce functional groups into the polyurethane, where these permit the dispersion or the crosslinking, or further polymer-analogous reaction, of the polyurethane. Monomers that can be used for this purpose are those such as isopropenyl-α,α-dimethylbenzyl isocyanate (TMI) and esters of acrylic or methacrylic acid, e.g. hydroxyethyl acrylate or hydroxyethyl methacrylate.

Adhesives with a particularly good property profile are especially obtained when diisocyanates (c) used are in essence only aliphatic diisocyanates, cycloaliphatic diisocyanates, or araliphatic diisocyanates. In an excellent procedure, this monomer combination is supplemented by, as component (d), alkali metal salts of a dihydroxymonocarboxylic acid or alkali metal salts of a diaminomonocarboxylic acid; the Na salt has the best suitability here.

Methods for adjusting the molecular weight of the polyurethanes via selection of the proportions of the monomers reactive toward one another, and also of the arithmetic average number of the reactive functional groups per molecule are well-known in the polyurethane chemistry sector. Components (a) to (g), and also their respective molar amounts, are normally selected in such a way that the quotient calculated from the entirety of all of the NCO groups and the entirety of all of the NCO-reactive OH groups, i.e. the A:B ratio, where
A is the molar amount of isocyanate groups, and
B is the sum of the molar amount of the hydroxy groups and the molar amount of the functional groups which can react with isocyanates in an addition reaction,
is 0.5:1 to 2:1, preferably 0.8:1 to 1.3:1, particularly preferably 0.9:1 to 1.2:1. It is very particularly preferable that the A:B ratio is as close as possible to 1:1.

The monomers (a) to (g) used usually bear an average of 1.5 to 2.5, preferably 1.9 to 2.1, particularly preferably 2.0, isocyanate groups and, respectively, functional groups which can react with isocyanates in an addition reaction.

Acid groups of the polyurethane have been neutralized at least to some extent with at least one organic or inorganic neutralizing agent. The extent of neutralization of the acid groups is preferably at least 20 mol %, particularly preferably at least 30 mol %, very particularly preferably at least 50 mol %. In particular from 20 to 80 mol %, particularly preferably from 30 to 70 mol %, of the acid groups have been neutralized.

It is preferable to use, as neutralizing agent, sodium hydroxide solution, potassium hydroxide solution, or ammonia, particular preference being given here to ammonia.

In one embodiment, the polyurethane derives essentially from
a) 10 to 80% by weight of at least one amorphous polyesterdiol with a molar mass above 500 to 4000 g/mol which derives from a mixture of at least one aliphatic dicarboxylic acid having from 3 to 10, preferably from 4 to 8, carbon atoms and at least one aromatic dicarboxylic acid in a ratio of 0.5:1 to 2:1, and from at least one alkanediol having from 2 to 10, preferably from 4 to 8, carbon atoms,
b) 10 to 80% by weight of at least one macrodiol, with a molar mass above 500 to 4000 g/mol, selected from the group consisting of polyetherdiols, preferably polytetrahydrofuran, and alkanediol polycarbonates having from 2 to 10, preferably from 4 to 8, carbon atoms in the alkane chain, and mixtures thereof,
c) 5 to 30% by weight of at least one organic diisocyanate or one mixture having an arithmetic average NCO functionality of 1.9 to 2.3, of organic isocyanate compounds,
d) 2 to 10% by weight of at least one dihydroxycarboxylic acid,
e) 0 to 5% by weight of at least one dihydric alcohol having an average molar mass of 62 to 500 g/mol, and
f) an amount of at least one organic or inorganic neutralizing agent such that at least 20% of compound d) are present in ionogenic, i.e. neutralized, form.

The polyaddition of the structural components to produce the polyurethane preferably takes place at reaction temperatures of up to 180° C., preferably up to 150° C., at atmospheric pressure or at autogenous pressure. The person skilled in the art knows how to produce polyurethanes or aqueous polyurethane dispersions. The polyurethanes preferably take the form of aqueous dispersion and are used in this form. The pH of the polymer dispersion is preferably adjusted to pH greater than 5, in particular to a pH between 5.5 and 8.5.

The adhesive to be used in the invention comprises carboxylate groups and preferably other reactive groups, where these can enter into a crosslinking reaction with one another or with external crosslinking agents. The amount present of said reactive groups is preferably 0.0001 to 0.5 mol/100 g of adhesive, particularly preferably 0.0005 to 0.5 mol/100 g of adhesive. Carboxy groups are also formed via saponification reactions, and crosslinking can therefore also occur without any initial content of carboxy groups in the polyurethane.

In one embodiment of the invention, the polyurethane dispersion adhesive comprises at least one external crosslinking agent. Examples of suitable crosslinking agents are polyisocyanates having at least two isocyanate groups, e.g. isocyanurates formed from diisocyanates, other examples being compounds having at least one carbodiimide group, chemically capped isocyanates, encapsulated isocyanates, and encapsulated uretdiones, biurets, or allophanates. Other suitable compounds are aziridines, oxazolines, and epoxides. Particular preference is given to aliphatic polyisocyanates, in particular water-emulsifiable polyisocyanates, e.g. Basonat® LR9056. The amount used of the external crosslinking agent is preferably 0.5 to 10% by weight, based on solids content of the dispersion. An external crosslinking agent is a compound which prior to the crosslinking reaction has not been bonded to the polyurethane but instead has been dissolved or dispersed in the polyurethane dispersion. However, it is also possible to use crosslinking agents bonded to the polyurethane (internal crosslinking agents).

The polyurethane dispersions of the invention are used in the invention in aqueous adhesive preparations for producing laminates, i.e. in aqueous lamination adhesive preparations for the adhesive bonding of large-surface-area substrates, in particular for producing composite foils.

The present invention therefore also provides a process for producing composite foils by providing an aqueous polyurethane dispersion described above. The aqueous polymer dispersion here can be used as it stands or, in the form of aqueous adhesive preparations, after modification with conventional auxiliaries. Examples of conventional auxiliaries are wetting agents, thickeners, protective colloids, light stabilizers, biocides, antifoams, etc. The optionally modified polyurethane dispersion is applied to a plastics foil or metal foil, and adhesive-bonded to one or more other plastics foils and/or metal foils, to give a composite foil.

The adhesive preparations of the invention do not require the addition of plasticizing resins (tackifiers) or of other plasticizers. In the process for producing composite foils, at least two substrates are adhesive-bonded to one another with use of the aqueous polymer dispersion. The substrates are large-surface-area, flexible components of which at least one is, and preferably two are, polymer foils.

In the process of the invention for producing composite foils, the polymer dispersion of the invention, or an appropriately modified preparation, is applied to the substrates to be adhesive-bonded, preferably with a layer thickness of 0.1 to 20 g/m$^2$, particularly preferably 1 to 7 g/m$^2$, e.g. by doctoring, spreading, etc. Conventional coating methods can be used, e.g. roll coating, reverse roll coating, gravure roll coating, reverse gravure roll coating, brush coating, bar coating, spray coating, airbrush coating, meniscus coating, curtain coating, or dip coating. After a short time for the air-drying of the dispersion water (preferably after 1 to 60 seconds) the coated substrate can be laminated to a second substrate, and the temperature here can by way of example be 20 to 200° C., preferably 20 to 100° C., and the pressure can be, for example, 100 to 3000 kN/m$^2$, preferably 300 to 2000 kN/m$^2$.

In one embodiment, the polymer dispersion of the invention is used as single-component composition, i.e. without additional crosslinking agent, in particular without isocyanate crosslinking agent. However, it is also possible to use the polymer dispersion of the invention as two-component adhesive, by adding a crosslinking component, e.g. a water-emulsifiable isocyanate. At least one of the substrates can have been printed or metalized on the side coated with the adhesive.

Examples of suitable substrates are polymer foils, in particular made of polyethylene (PE) or of oriented polypropylene (OPP), other examples being unstretched polypropylene (CPP), polyamide (PA), polyethyleneterephthalate (PET), polyacetate, cellophane, metal-coated, e.g. aluminum-coated (metalized) polymer foils (abbreviated to: metalized foils), or metal foils, e.g. made of aluminum. The foils mentioned can be adhesive-bonded to one another or to a foil of another type, e.g. polymer foils to metal foils, various polymer foils to one another, etc. The foils mentioned can by way of example also have been printed with printing inks.

One embodiment of the invention is a composite foil obtainable by the abovementioned process, i.e. produced with use of one of the inventive aqueous polyurethane dispersions described above. The material of a first foil is preferably one selected from OPP, CPP, PE, PET, and PA, and the material of a second foil is preferably one selected from OPP, CPP, PE, PET, PA, and metal foil. In one embodiment of the invention, the first foil and/or the second foil has been printed or metalized on the respective side which is coated with the polymer dispersion of the invention. The thickness of the substrate films can by way of example be 5 to 100 μm, preferably 5 to 40 μm. In preferred composite foils, the foil material is one selected from the group consisting of aluminum foil, printed polyester foil, unprinted polyester foil, printed polyamide foil, unprinted polyamide foil, propylene foil, polyethylene foil, and combinations thereof.

There is no essential need for any surface treatment of the foil substrates prior to coating with a polymer dispersion of the invention. However, better results can be obtained if the surface of the foil substrates is modified prior to coating. Conventional surface treatments can be used here, for example corona treatment for increasing adhesion. The corona treatment or other surface treatments are carried out to the extent required for adequate wettability with the coating composition. A corona treatment of about 10 watts per square meter and minute is usually adequate for this purpose. As an alternative, or additionally, it is optionally also possible to use primers or intermediate layers between foil substrate and adhesive coating. The composite foils can moreover have further, additional functional layers, e.g. barrier layers, print layers, paint layers or lacquer layers, or protective layers. The location of the functional layers here can be external, i.e. on that side of the foil substrate that faces away from the adhesive-coated side, or internal, between foil substrate and adhesive layer.

An advantage of the invention is that it is possible to adhesive-bond, i.e. laminate, a very wide variety of different substrates to one another, where the polymer dispersions of the invention ensure good adhesion of the adhesive preparation on the substrates and it is possible to produce composite foils that can withstand high stresses and which in particular can be used for retort applications and for hot-filling uses.

EXAMPLES

Inventive Example IE1

346.5 g (0.16 mol) of a polyesterol having OH number 53.1 derived from adipic acid/isophthalic acid and 1,6-hexanediol, 328 g (0.16 mol) of a polyTHF having OH number 56.1 and 51.5 g (0.384 mol) of dimethylolpropionic acid, and also 66 g of acetone, were used as initial charge in a stirred flask with reflux condenser and thermometer. After addition of 112.5 g (0.669 mol) of hexamethylene diisocyanate, the mixture is stirred for 95 min at an external temperature of 115° C. 1016 g of acetone were then used for dilution, and the mixture was cooled to room temperature. The NCO content of the solution was determined as 0.04%. 61.3 g of an 8.5% aqueous ammonia solution were added to this mixture. After 10 minutes, 1232 g of water were used for dispersion. Distillation of the acetone gave an aqueous polyurethane dispersion with 41% solids content.

Inventive Example IE2

126.8 g (0.06 mol) of a polyesterol having OH number 53.1 derived from adipic acid/isophthalic acid and 1,6-hexanediol, 110.4 g (0.06 mol) of a polycarbonate having OH number 61.0 and 19.3 g (0.144 mol) of dimethylolpropionic acid, and also 25 g of acetone, were used as initial charge in a stirred flask with reflux condenser and thermometer. After addition of 46 g (0.264 mol) of tolylene diisocyanate, the mixture is stirred for 180 min at an external temperature of 115° C. 381 g of acetone were then used for dilution, and the mixture was cooled to room temperature. The NCO content of the solution was determined as 0.254%. 24 g of a 9% aqueous ammonia solution were added to this mixture. After 10 minutes, 360 g of water were used for dispersion. Distillation of the acetone gave an aqueous polyurethane dispersion with 41% solids content.

Comparative Example CE1

Analogous to Example 1 of EP 0615 988

Luphen® 3621: polyether-based polyurethane dispersion based on a propylene oxide polyether, dimethylolpropionic acid, and tolylene diisocyanate with about 50% solids content.

Comparative Example CE2

Epotal® Eco: polyurethane dispersion based on a polyesterol made of adipic acid/1,4-butanediol, tolylene diisocyanate/hexamethylene diisocyanate, and aminoethylaminopropionic acid with about 40% solids content.
Production and Testing of Composite Foils An amount of 5 g/m² of the polyurethane dispersions to be tested were applied to foils made of polyethylene terephtalate (PET) with thickness 36 µm, with use of 3% by weight of Basonat®LR9056 (water-emulsifiable isocyanate crosslinking agent based on aliphatic isocyanates). The coated foils were pressed with another foil (aluminum foil).

The composite foils were subjected to a retort treatment, by treatment at 120° C. for 45 minutes in an atmosphere saturated with water vapor.

A tensile test machine was used to determine the peel resistance in N/15 mm of test strips of the foil composite, width 15 mm, peel velocity 100 mm/min. Table 1 collates the results.

TABLE 1

| | Peel values | |
|---|---|---|
| Example | Peel value [N/15 mm] prior to retort treatment | Peel value [N/15 mm] after retort treatment |
| IE1 | 4.9 | 5.0 |
| IE2 | 3.2 | 4.7 |
| CE1 Luphen ® 3621 | 2.2 | 3.9 |
| CE2 Epotal ® Eco | 1.5 | 0.6 |

The results in table 1 show that the mechanical properties of the dispersions IE1 and IE2 of the invention are markedly superior to those of the (commercially available) comparative examples CE1 and CE2. This applies both prior to and after the heat treatment in water (retort treatment).

The invention claimed is:
1. A process for producing composite foils, which comprises:
   applying an aqueous polyurethane dispersion to a first plastic foil or metal foil to form a layer of said aqueous polyurethane dispersion on said first plastic foil or metal foil;
   contacting said layer of said aqueous polyurethane dispersion with a second plastic foil or metal foil, and
   curing said layer of said aqueous polyurethane dispersion to form an adhesive layer between said first plastic foil or metal foil and said second plastic foil or metal foil, thereby forming a composite foil,
   wherein at least 20% by weight of the polyurethane present in said aqueous polyurethane dispersion is comprised of units of an amorphous polyester polyol which is an ester of carboxylic acid units.
2. The process according to claim 1, wherein the amorphous polyester polyol does not have a melting point in the temperature range from −30° C. to +60° C.
3. The process according to claim 1, wherein the polyurethane comprises monomer units of:
   a) 10 to 80% by weight of at least one amorphous polyesterdiol having a molar mass above 500 to 4000 g/mol;
   b) 10 to 80% by weight of at least one further macrodiol differing from the amorphous polyesterdiol a) and having a molar mass above 500 to 4000 g/mol;
   c) 5 to 30% by weight of at least one organic diisocyanate or one mixture having an arithmetic average NCO functionality of 1.9 to 2.3 of organic isocyanate compounds;
   d) 2 to 10% by weight of at least one compound selected from a mono- to trihydric alcohol, where this compound also comprises at least one ionic group or at least one group convertible into an ionic group, and a diaminocarboxylic acid;
   e) 0 to 5% by weight of at least one dihydric alcohol having an average molar mass of 62 to 500 g/mol;
   f) 0 to 5% by weight of further polyfunctional compounds differing from the monomers a) to e) and having reactive groups of alcoholic hydroxy groups, primary or secondary amino groups, or isocyanate groups;
   g) 0 to 5% by weight of monofunctional compounds differing from the monomers a) to f) and having a reactive group, where this involves an alcoholic hydroxy group, a primary or secondary amino group, or an isocyanate group; and
   h) an amount of at least one organic or inorganic neutralizing agent so that at least 20% of compound d) is present in ionogenic or neutralized, form.
4. The process according to claim 1, wherein the polyurethane comprises monomer units of:
   a) 10 to 80% by weight of at least one amorphous polyesterdiol having a molar mass above 500 to 4000 g/mol which comprises monomer units from a mixture of at least one aliphatic dicarboxylic acid having from 3 to 10 carbon atoms, at least one aromatic dicarboxylic acid, and at least one alkanediol having from 2 to 10 carbon atoms, where said aliphatic dicarboxylic acid and said aromatic dicarboxylic acid are present in a ratio of 0.5:1 to 2:1;
   b) 10 to 80% by weight of at least one macrodiol having a molar mass above 500 to 4000 g/mol, selected from the group consisting of a polyetherdiol, an alkanediol polycarbonates having from 2 to 10 carbon atoms in the alkane chain, and a mixture thereof;
c) 5 to 30% by weight of at least one organic diisocyanate or one mixture having an arithmetic average NCO functionality of 1.9 to 2.3 of organic isocyanate compounds;
d) 2 to 10% by weight of at least one dihydroxycarboxylic acid;
e) 0 to 5% by weight of at least one dihydric alcohol having an average molar mass of 62 to 500 g/mol; and
f) an amount of at least one organic or inorganic neutralizing agent so that at least 5% of compound d) is present in ionogenic or neutralized form.

5. The process according to claim 4, wherein the polyurethane comprises monomer units of:
a) 10 to 80% by weight of at least one amorphous polyesterdiol with a molar mass above 500 to 4000 g/mol which comprises monomer units from a mixture of at least one aliphatic dicarboxylic acid having from 4 to 8 carbon atoms, at least one aromatic dicarboxylic acid, and at least one alkanediol having from 4 to 8 carbon atoms, where said aliphatic dicarboxylic acid and said aromatic dicarboxylic acid are present in a ratio of 0.5:1 to 2:1;
b) 10 to 80% by weight of at least one macrodiol is selected from the group consisting of a polytetrahydrofuran having a molar mass above 500 to 4000 g/mol, an alkanediol polycarbonates having from 4 to 8 carbon atoms in the alkane chain and a molar mass above 500 to 4000 g/mol, and a mixture thereof;
c) 5 to 30% by weight of at least one organic diisocyanate or one mixture having an arithmetic average NCO functionality of 1.9 to 2.3 of organic isocyanate compounds,
d) 2 to 10% by weight of at least one dihydroxycarboxylic acid,
e) 0 to 5% by weight of at least one dihydric alcohol having an average molar mass of 62 to 500 g/mol, and
f) an amount of at least one organic or inorganic neutralizing agent so that at least 20% of compound d) is present in ionogenic or neutralized, form.

6. The process according to claim 1, wherein said aqueous polyurethane dispersion further comprises an external crosslinking agent.

7. The process according to claim 6, wherein said external crosslinking agent comprises an aliphatic polyisocyanate.

8. The process according to claim 1, wherein the polyurethane comprises monomer units of:
a) at least one amorphous polyesterdiol having a molar mass above 500 to 4000 g/mol;
b) at least one further macrodiol differing from the amorphous polyesterdiol a) and having a molar mass above 500 to 4000 g/mol;
c) at least one organic diisocyanate or one mixture having an arithmetic average NCO functionality of 1.9 to 2.3 of organic isocyanate compounds;
d) at least one compound selected from the group consisting of a mono- to trihydric alcohol which also comprises at least one ionic group or at least one group convertible into an ionic group, a diaminocarboxylic acid, and a diaminosulfonic acid;
e) optionally at least one dihydric alcohol having an average molar mass of 62 to 500 g/mol;
f) optionally further polyfunctional compounds differing from the monomers a) to e) and having reactive groups of alcoholic hydroxy groups, primary or secondary amino groups, or isocyanate groups;
g) optionally monofunctional compounds differing from the monomers a) to f) and having a reactive group, where this involves an alcoholic hydroxy group, a primary or secondary amino group, or an isocyanate group; and
h) at least one organic or inorganic neutralizing agent.

9. The process according to claim 8, wherein said at least one organic diisocyanate of component c) is toluene 2,4-diisocyanate, and said at least one organic or inorganic neutralizing agent of component h) is ammonia.

10. The process according to claim 8, wherein the amorphous polyester diol a) is a mixture of at least one aliphatic dicarboxylic acid having 3 to 10 carbon atoms, at least one aromatic dicarboxylic acid, and at least one alkanediol having 2 to 10 carbon atoms, where said aliphatic dicarboxylic acid having 3 to 10 carbon atoms and said aromatic dicarboxylic acid are present in a ratio of 0.5:1 to 2:1.

11. The process according to claim 8, wherein the amorphous polyester diol a) is a mixture of at least one aliphatic dicarboxylic acid having 4 to 8 carbon atoms, at least one aromatic dicarboxylic acid, and at least one alkanediol having 4 to 8 carbon atoms, where said aliphatic dicarboxylic acid having 4 to 8 carbon atoms and said aromatic dicarboxylic acid are present in a ratio of 0.5:1 to 2:1.

12. The process according to claim 8, wherein the amorphous polyester a) is a mixture of adipic acid and isophthalic acid and at least one alkanediol having 4 to 8 carbon atoms, where said adipic acid and said isophthalic acid are present in a ratio of 0.5:1 to 2:1.

13. The process according to claim 8, wherein the macrodiol b) is at least one member selected from the group consisting of a polyetherdiol, an alkanediol polycarbonate having from 2 to 10 carbon atoms in the alkane chain, and a mixture thereof.

14. The process according to claim 8, wherein the macrodiol b) is at least one member selected from the group consisting of polytetrahydrofuran, an alkanediol polycarbonate having from 4 to 8 carbon atoms in the alkane chain, and a mixture thereof.

15. The process according to claim 8, wherein compound d) is a dihydroxycarboxylic acid.

16. The process according to claim 8, wherein compound d) is dimethylolpropionic acid.

17. The process according to claim 8, wherein a quotient of all of the NCO groups and the entirety of all of the NCO-reactive OH groups in components a) to g) is between 0.8 and 1.3.

18. The process according to claim 8, wherein components a) and b) are present in an amount of from 10 to 100 mol % and component e) is present in an amount of from 0 to 90 mol %, relative to the total molar amount of diols used to make said polyurethane.

19. A composite foil obtained by the process according to claim 1.

20. A composite foil according to claim 19, wherein the foil material is one selected from the group consisting of aluminum foil, printed polyester foil, unprinted polyester foil, printed polyamide foil, unprinted polyamide foil, polypropylene foil, polyethylene foil, and combinations thereof.

* * * * *